US008822090B2

United States Patent
Ma et al.

(10) Patent No.: US 8,822,090 B2
(45) Date of Patent: Sep. 2, 2014

(54) INTERNALLY REFORMING FUEL CELL ASSEMBLY WITH STAGED FUEL FLOW AND SELECTIVE CATALYST LOADING FOR IMPROVED TEMPERATURE UNIFORMITY AND EFFICIENCY

(75) Inventors: Zhiwen Ma, Sandy Hook, CT (US); Mohammad Farooque, Danbury, CT (US); Ramakrishnan Venkataraman, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 698 days.

(21) Appl. No.: 12/720,328

(22) Filed: Mar. 9, 2010

(65) Prior Publication Data

US 2010/0227234 A1  Sep. 9, 2010

Related U.S. Application Data

(60) Provisional application No. 61/158,712, filed on Mar. 9, 2009.

(51) Int. Cl.
*H01M 8/06* (2006.01)
*B01J 19/24* (2006.01)
*H01M 8/24* (2006.01)

(52) U.S. Cl.
CPC .............. *H01M 8/0612* (2013.01); *Y02E 60/50* (2013.01); *H01M 8/0637* (2013.01); *B01J 19/249* (2013.01); *H01M 8/0625* (2013.01); *H01M 8/244* (2013.01)
USPC .......................................... 429/423; 429/408

(58) Field of Classification Search
None
See application file for complete search history.

(56) References Cited

U.S. PATENT DOCUMENTS 3,453,146 A * 7/1969 Bawa et al. ................... 429/414
4,182,795 A   1/1980 Baker et al.
4,365,007 A   12/1982 Maru et al.
(Continued)

FOREIGN PATENT DOCUMENTS

JP   2004-244230 B   2/2004

OTHER PUBLICATIONS

European Search Report and Written Opinion issued on Oct. 27, 2010 which issued in counterpart PCT application No. PCT/US2010/026647.

*Primary Examiner* — Ula C Ruddock
*Assistant Examiner* — Matthew Van Oudenaren
(74) *Attorney, Agent, or Firm* — Cowan, Liebowitz & Latman, P.C.

(57) ABSTRACT

A fuel cell assembly including a fuel reforming unit for reforming a fuel supply for a series of fuel cells constituting a fuel cell stack. The reformed fuel supply is routed first to the anode of the fuel cell most adjacent the reforming unit, and thereafter to a manifold external to the stack. The manifold intakes that portion of the reformed fuel supply not fully exhausted after passing through the first anode and feeds such reformed fuel to successive fuel cells in series, thus providing staged fuel supply throughout the stack and optimal fuel utilization in producing electricity. The reforming unit includes a series of baffles for directing the reformed fuel supply to the first anode and to the manifold to maximize utilization of fuel consumed by cells in the stack. Also, cooling occurring as a result of the endothermic reaction occurring in the reforming unit is captured and spread optimally throughout the stack to achieve optimal temperature gradients throughout the stack, thus enabling optimal operation of and increased life of the stack.

25 Claims, 5 Drawing Sheets

(56) References Cited

U.S. PATENT DOCUMENTS

| | | |
|---|---|---|
| 4,444,851 A | 4/1984 | Maru |
| 4,567,117 A | 1/1986 | Patel et al. |
| 4,647,516 A | 3/1987 | Matsumura et al. |
| 4,788,110 A | 11/1988 | Bernard |
| 4,877,693 A | 10/1989 | Baker |
| 5,082,752 A | 1/1992 | Koga et al. |
| 5,175,062 A | 12/1992 | Farooque et al. |
| 5,209,906 A | 5/1993 | Watkins et al. |
| 5,348,814 A * | 9/1994 | Niikura et al. ............... 429/423 |
| 5,480,738 A * | 1/1996 | Elangovan et al. ........... 429/423 |
| 5,773,161 A | 6/1998 | Farooque et al. |
| 5,882,809 A * | 3/1999 | McPheeters et al. ......... 429/456 |
| 6,159,627 A | 12/2000 | Yuh et al. |
| 6,200,696 B1 * | 3/2001 | Farooque et al. ............. 429/425 |
| 6,274,101 B1 * | 8/2001 | Sechrist ........................ 422/198 |
| 6,372,374 B1 | 4/2002 | Li et al. |
| 6,531,237 B2 | 3/2003 | Kelley et al. |
| 6,610,434 B1 * | 8/2003 | Draper et al. ................. 429/408 |
| 6,974,644 B2 | 12/2005 | Blanchet et al. |
| 7,393,605 B2 | 7/2008 | Blanchet et al. |
| 2004/0071617 A1 | 4/2004 | Blanchet et al. |
| 2006/0014061 A1 * | 1/2006 | Kim et al. ....................... 429/19 |
| 2006/0123705 A1 * | 6/2006 | Ma et al. ........................... 48/61 |

\* cited by examiner

INTERNALLY REFORMING FUEL CELL ASSEMBLY WITH STAGED FUEL FLOW AND SELECTIVE CATALYST LOADING FOR IMPROVED TEMPERATURE UNIFORMITY AND EFFICIENCY

CROSS-REFERENCE TO RELATED APPLICATION

This application is a non-provisional application based on provisional application Ser. No. 61/158,712, filed Mar. 9, 2009, the entire disclosure of which is hereby incorporated by reference

BACKGROUND OF THE INVENTION

This invention relates to fuel cells arranged in a fuel cell stack and, in particular, to a fuel cell stack design and method configured to enhance overall fuel utilization and control temperature distribution in the stack and thereby provide an increased service life for the stack.

A fuel cell is a device which directly converts chemical energy stored in hydrocarbon fuel into electrical energy by means of an electrochemical reaction. Generally, a fuel cell comprises an anode and a cathode separated by a member which serves itself to conduct electrically charged ions or is adapted to hold an electrolyte which conducts electrically charged ions. In order to produce a useful power level, a number of individual fuel cells are stacked in series with an electrically conductive separator plate separating the cells.

Before undergoing the electrochemical reaction in the fuel cell, hydrocarbon fuels such as methane, coal gas, etc. are typically reformed to produce hydrogen for use in the anode of the fuel cell. In internally reforming fuel cells, a steam reforming catalyst is placed within the fuel cell stack to allow direct use of hydrocarbon fuels without the need for expensive and complex reforming equipment. In addition, the endothermic reforming reaction can be used advantageously to help cool the fuel cell stack.

Internally reforming fuel cells employ direct internal reforming and indirect internal reforming. Direct internal reforming is accomplished by placing the reforming catalyst within the active anode compartment. Direct internal reforming thus directly exposes the catalyst to the electrolyte of the fuel cell, which can lead to deactivation of the catalyst and an eventual degradation of the fuel cell's performance. Improvements have been made to the direct internal reforming technique to reduce electrolyte contamination, but these improvements are accompanied by high costs due to the complexity of the fuel cell design, special materials requirements and a reduction in the effectiveness of the reforming catalyst.

The second reforming technique, indirect internal reforming, is accomplished by placing the reforming catalyst in an isolated chamber within the fuel cell stack and routing the reformed gas from this chamber into the anode compartment of the fuel cell. With this technique, the need for separate ducting systems raises the cost of the fuel cell stack and also makes the system susceptible to fuel leaks.

The current state of the art uses a hybrid assembly in which the fuel cell stack has both direct and indirect internal reforming and in which external manifolds are used for enclosing and directing the flow of fuel and oxidant gases into the stack. U.S. Pat. No. 6,200,696 and U.S. Patent Application Publication No. 2006/0123705, assigned to the same assignee hereof, disclose examples of such hybrid assemblies. As disclosed in the '696 patent and the 2006/0123705 publication, the hybrid assembly includes one or more fuel reformers for indirect internal reforming of input fuel gas, which receive the input fuel gas and convey it in a U-shaped path while reforming the fuel therein. The assembly of the '696 patent and the 2006/0123705 publication also includes a fuel-turn manifold for redirecting reformed gas outputted by the indirect internal reformers to the anode compartments for further reforming through direct internal reforming and electrochemical conversion. In these assemblies, both the U-shaped flow path in the reformer and the flow through the anode compartments of the fuel cells is in cross-flow, or perpendicular to, the oxidant gas passing through the stack.

Due to the nature of the fuel flow within the fuel reformers, such hybrid assemblies are sometimes susceptible to non-uniformity in their current density distribution and to temperature gradients near the gas exits of the stack. These effects occur as the stack ages and as the catalyst within the stack plates, the Direct Internal Reforming (DIR) catalyst, is deactivated over the course of the service life of the stack. As a result, thermal instability within the stack may occur and may cause non-optimized fuel utilization in the production of electricity. This is especially true given the maximum allowable temperature at which the stack is designed to operate.

It is therefore an object of the present invention to further improve fuel cell stack design and methodology so as to create a fuel flow arrangement which increases the fuel conversion efficiency of the stack.

It is also an object of the present invention to provide a fuel cell stack design and methodology which promotes cooling so as to realize a more uniform temperature distribution, thus increasing the overall efficiency of the fuel cell operation and electricity production and extending the operating life of the stack.

SUMMARY OF THE INVENTION

The above and other objects are realized in a reformer for use in a fuel cell system comprising an enclosure including an inlet port and an outlet port, and a plate assembly supporting reforming catalyst disposed within the enclosure, wherein the outlet port is configured to abut a fuel inlet port of a fuel cell assembly adjacent to the reformer, when the reformer is assembled into the fuel cell system, so that at least a first portion of the fuel reformed by the reformer is supplied directly from the outlet port of the reformer to the inlet port of the fuel cell assembly.

In some embodiments, the reformer is configured to supply all of the fuel reformed thereby to the inlet of the fuel cell assembly adjacent the reformer, while in other embodiments the reformer comprises a further outlet port for outputting a second portion of the fuel reformed by the reformer to the fuel cell manifold when the reformer is assembled into the fuel cell system. The plate assembly of the reformer includes a plurality of sections, including an inlet section communicating with the inlet port, an outlet section communicating with the outlet port and a central section disposed between the inlet section and the outlet section, and the plate assembly further includes a plurality of baffles for directing the fuel flow through the plate assembly. The central section of the plate assembly may include a plurality of zones, each of which communicates with the inlet section and with the outlet section and a plurality of baffles for directing the flow of fuel into each of the zones. The loading density of the reforming catalyst supported by the plate assembly is varied so that the inlet section has a first loading density, the central section has a second loading density which is greater than the first loading density, and the outlet section has a third loading density which is smaller than or equal to the second loading density.

A fuel cell system that includes the reformer is also disclosed. The fuel cell system comprises a plurality of fuel cell assemblies and at least one reformer, forming a fuel cell stack, with the plurality of fuel cell assemblies including at least one reformer-associated assembly and one or more non-reformer-associated assemblies. Each of the reformer-associated assemblies is adjacent to and associated with a reformer. Each reformer is configured to receive fuel through an inlet port and to output at least a first portion of fuel reformed in the reformer through an outlet port directly to the reformer-associated assembly associated with the reformer, and each reformer-associated assembly is configured to output partially spent fuel for use in one or more non-reformer-associated assemblies. In some embodiments, the fuel cell stack includes a fuel inlet face, a fuel outlet face, an oxidant inlet face and an oxidant outlet face and comprises a plurality of manifolds including at least a fuel inlet manifold that sealingly encloses the fuel inlet face of the stack. In such embodiments, each reformer-associated assembly outputs partially spent fuel into the fuel inlet manifold and the fuel inlet manifold is configured to direct the partially spent fuel to the non-reformer-associated assemblies. In some embodiments the reformer-associated assembly includes no reforming catalyst, while the non-reformer-associated assembly supports reforming catalyst for directly reforming the partially spent fuel. A method of operating the fuel cell system that includes at least one reformer and a plurality of fuel cell assemblies is also described.

The above and other objects are also realized in a fuel cell stack having fuel cell assemblies stacked one after the other in a stacking direction and each including an anode part and a cathode part separated by an electrolyte receiving part and stacked in the stacking direction and one or more reforming units interspersed within the stack each between an associated anode compartment and an associated cathode compartment of fuel cell assemblies which follow one another in the stacking direction, each reforming unit and the associated anode compartment being configured such that reformed fuel gas from the reformer is supplied directly to the associated anode compartment where the reformed fuel gas undergoes partial electrochemical conversion in the fuel cell assembly containing the associated anode compartment and each associated anode compartment being further configured such as to make available to the anode compartment of other fuel cell assemblies the part of the reformed fuel gas that does not undergo electrochemical conversion in the fuel cell assembly containing the associated anode part.

In some of the embodiments of the invention, each reformer has an output port in a surface of the reformer in the stacking direction and each associated anode compartment has an input port in a surface of the anode compartment in the stacking direction which communicates with the reformer output port. In certain of these embodiments, an output port of each associated anode compartment is at a fuel inlet face of the fuel cell stack and the input ports of the anode compartments other than the associated anode compartments are also at the fuel inlet face of the stack. In some of these embodiments, a manifold abuts the fuel inlet face of the stack so that reformed fuel gas from the output ports of the associated anode compartments is conveyed by the manifold to the input ports of the anode compartments other than the associated anode compartments.

Additionally, in certain embodiments, the stack has a fuel outlet face opposite the fuel inlet face and the output ports of the anode compartments other that the associated anode compartments are at this fuel outlet face. In these embodiments, the input port of the reformers can be at the fuel inlet face of the stack, the output port of the reformers can have a first part which runs in a first direction running between the fuel inlet and fuel outlet faces of the stack and optionally a second part adjacent the second face of the stack that runs transverse to the first direction. Additionally, in these embodiments, the input ports of the associated anode compartments can likewise run in the first direction running between the fuel inlet and fuel outlet faces of the stack.

Also, in some of these embodiments, the associated anode compartments contain no or a little amount (less than 50 g) of catalyst for reforming fuel gas, while the anode compartments other than the associated anode compartments contain larger amounts (greater than 400 g) of catalyst for reforming fuel gas.

In certain embodiments, the output port of the reformer can have a part which runs along the length of the reformer and a part which runs along the width of the reformer. In some embodiments, the reformer can have an additional output port at a face of the stack.

Additionally, in certain embodiments, the reformers and cathode and anode compartments are configured such that flow of gas through the reformers is counter to the flow of oxidant gas through the cathode compartments, while the flow of gas through the associated anode compartments is co-flow with the flow of gas through the anode compartments and the flow of gas through the anode compartments other that the associated anode compartments is transverse or cross to the flow of gas through the cathode compartments. In other embodiments, the reformers and cathode and anode compartments are configured such that flow of gas through the reformers is counter to the flow of oxidant gas through the cathode compartments, while the flow of gas through the associated anode compartments is co-flow with the flow of gas through the cathode compartments and the flow of gas through the anode compartments other that the associated anode compartments is counter to the flow of gas through the cathode compartments.

Also, disclosed are particular configurations of the reformer and fuel cell assemblies.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
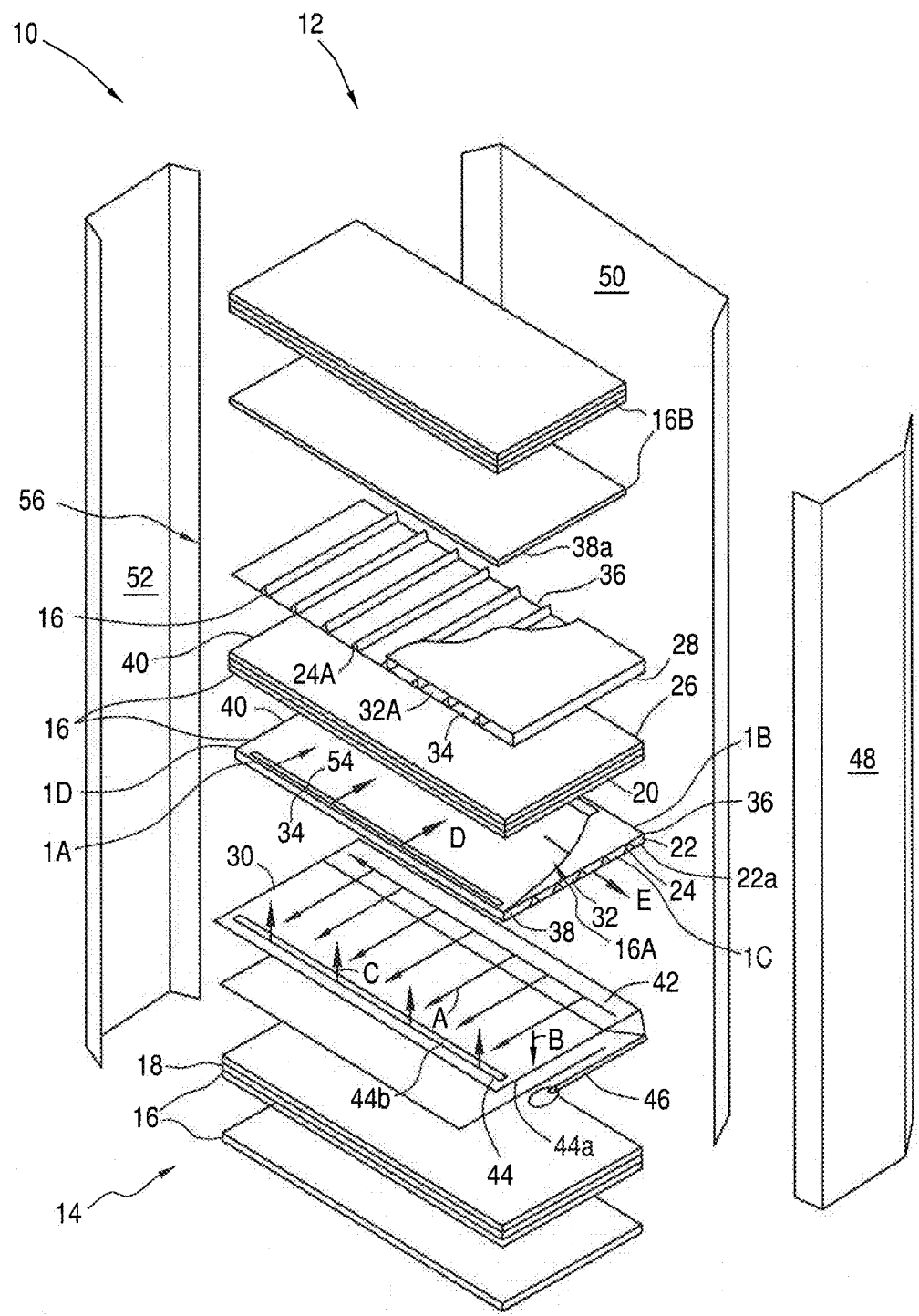
FIG. 1 shows an exploded view of a cross-flow fuel cell stack for an externally manifolded mixed flow field according to the present invention.

FIG. 1 shows a fuel cell assembly 10, including a fuel cell stack 12 comprising a plurality of cell assemblies 16 stacked one after the other in a stacking direction of the stack 12. In the illustrative embodiment shown in FIG. 1, the cell assemblies 16 are stacked one on top of the other so as to form the fuel cell stack 12. The fuel cell assembly 10 also includes one or more reforming units, or reformers 30, for internally reforming hydrocarbon fuel and for supplying reformed fuel to the fuel cells. In the illustrative embodiment shown in FIG. 1, only one reformer 30 is shown. However, in typical fuel cell assemblies, a plurality of reformers 30 is provided at predetermined intervals throughout the stack, e.g. one reformer 30 for every 1 to 6 cell assemblies 16, so that each reformer 30 supplies reformed fuel to its respective group of assemblies. The number of the reformers 30 provided in each stack 12 is dependent on the size of the stack 12. As described in more detail below, the cell assemblies 16 include one or more cell assemblies 16A, each of which is adjacent to, or associated with, a respective reforming unit 30 (hereinafter "reformer-associated assembly 16A"), and one or more other cell assemblies 16B not associated with a reformer 30. It is contemplated that each reformer 30 in the assembly will service a reformer-associated cell assembly 16A and at least five cell assemblies 16B not associated with the reformer. The cell assemblies 16 are separated adjacent cell assemblies and/or from adjacent one or more reformers by separator plates (not shown).

As shown in FIG. 1, each cell assembly 16 includes an electrolyte matrix 18 sandwiched between an anode electrode 20 and a cathode electrode 26. The electrolyte matrix 18 is adapted to store an electrolyte therein, such as carbonate electrolyte, to conduct electrically charged ions between the electrodes 20, 26. Each assembly 16 further comprises an anode current collector 22 associated with and abutting the anode electrode 20. In particular, in FIG. 1, the anode electrode 20 has two opposing surfaces, wherein one of the opposing surfaces abuts, or faces, the electrolyte matrix and the other of the opposing surfaces abuts, or faces, the anode current collector 22. The anode current collector 22 includes a plurality of corrugations 24, which face the anode electrode 20 and which form together with the surface of the anode electrode 20 a plurality of fuel gas channels 32 through which the fuel gas passes. In certain cell assemblies 16, a reforming catalyst is placed in the fuel gas channels 32 of all or some of the anode current collectors 22 in the fuel cell stack, so that the fuel gas is further reformed by the reforming catalyst as it passes through the gas channels 32 by direct internal reforming.

As shown in FIG. 1, each cathode current collector 26 also has a plurality of corrugations 24A which define, together with the associated cathode electrode 28 that abuts the cathode current collector, a plurality of oxidant gas channels 32A through which the oxidant gas passes. Oxidant gas inlet ports 34 are formed at one end of the oxidant gas channels 32A and are situated on a first face 1A of the stack, and oxidant gas exhaust ports 36, or oxidant outlet ports, are formed at the other end of the oxidant gas channels 32A, and are situated on a second face 1B of the stack 12, opposing the first face 1A. In this way, oxidant gas is supplied to each assembly 16 through the oxidant gas inlet ports 34 and carried through the oxidant gas channels 32A for use in the respective fuel cell cathode electrode 26. Spent oxidant gas is then outputted from each assembly 16 through the oxidant gas exhaust ports 36.

In the anode current collectors 22 of the assemblies 16B, other than the reformer-associated assemblies 16A, fuel gas inlet ports 38a are formed at one end of the fuel gas channels 32 and are situated on a third face 1C of the stack 12 and fuel gas exhaust ports 40, or fuel gas outlet ports, are formed at the other end of the fuel gas channels 32 on a fourth face 1D of the stack 12, opposing the third face 1C. In this way, fuel is supplied to each assembly 16B through the fuel gas inlet ports 38a and carried through the fuel gas channels 32 for use in the respective fuel cell anode electrode 20. Spent fuel is then outputted from each assembly 16B through the fuel gas exhaust ports 40.

In the fuel cell assembly 10 shown in FIG. 1, each reformer 30 comprises a fuel inlet 42 located on the same side as the oxidant gas exhaust ports, i.e., on the second face 1B of the stack, and an outlet 44 through which fuel gas, comprising reformed or partially reformed hydrocarbon fuel, is emitted after having been reformed in the reformer 30. As shown, fuel is supplied to the fuel inlet 42 of each reformer 30 via a fuel supply feed 46. An example of a fuel supply feed 46 and a reformer fuel delivery system for supplying fuel to the reformers in the stack is disclosed in U.S. Pat. No. 6,200,696, assigned to the same assignee herein and incorporated herein by reference. As shown in FIG. 1, the fuel supply feed 46 extends along and adjacent to a side of the reformer 30 on the third stack face 1C.

The fuel cell assembly 10 includes a plurality of manifolds enclosing second, third and fourth stack faces 1B-1D. As shown, a fuel-turn manifold 48 sealingly encloses the third stack face 1C, the fuel supply feed 46 and the adjacent side of the reformer 30. The fuel-turn manifold 48 prevents loss of fuel during its delivery to the one or more reformers 30 and receives reformed or partially reformed fuel outputted from the one or more reformers 30 and from each reformer-associated assembly 16A. The fuel-turn manifold 48 also directs the reformed or partially reformed fuel to the fuel gas inlet ports 38a of the assemblies 16B that are not adjacent to, or associated with, the reformer 30, as described in more detail herein below. The fuel-turn manifold 48 comprises an internal feed tube and supply header (not shown) for distribution of fuel to each of the reformers 30 throughout the stack 12. Manifolds 50 and 52 enclose second and fourth stack faces 1B and 1D, respectively, receive exhausted oxidant and fuel gases, respectively, leaving the stack 12.

As can be seen in FIG. 1, fuel enters the reformer 30 from the fuel supply feed 46 through the fuel inlet 42, which is located on the same side of the stack 1B as the oxidant gas exhaust ports, and flows across the reformer 30 in a counter-flow direction relative to the oxidant gas flowing through the assemblies 16 of the stack 12. That is, the oxidant gas flows through each cell assembly 16 of the stack 12 in a first direction, shown as direction of arrow "G" in FIGS. 4 and 5, while the fuel gas flows through the reformer 30 in a second direction, which is opposite to the first direction, shown as direction of arrows "A" in FIG. 1. The amount of fuel flow provided to the reformer 30 from the fuel supply feed 46 is in excess of the fuel amount consumed in the electrochemical reactions of the stack so as to achieve stable operation of the stack and sufficient production of electricity by the stack. In particular, the amount of fuel provided to the reformer 30 is typically 20-30% greater than the amount consumed by the electrochemical reactions in the stack.

In certain embodiments, the fuel flowing through the reformer 30 is divided into two portions, with a first portion of the fuel flowing in the direction of the arrows "A" and a second portion being directed to the fuel-turn manifold 48, as shown by arrow "B" in FIG. 1. The second portion of the fuel is output from the reformer outlet 44*a* located on the third side 1C of the stack and is received by the fuel turn manifold 48 which directs the fuel to the cell assemblies 16B which are not associated with the reformer 30. The first portion of the fuel flows toward the reformer outlet 44*b* located along the first side 1A of the stack corresponding to the oxidant inlet side, and is output from the reformer outlet 44*b* directly into an inlet port 54 of an associated or adjacent anode current collector 22*a* of the reformer-associated cell assembly 16A. The flow of the first portion of the fuel from the reformer outlet 44*b* to the inlet port 54 of the associated anode current collector 22*a* is shown by arrows "C" in FIG. 1.

In certain embodiments, the reformer 30 and the reformer-associated cell assembly 16A are separated by a separator plate, which includes one or more openings corresponding to and aligned with the reformer outlet 44*b* and the inlet port 54 of the anode current collector 22*a*. In addition, in some embodiments, the reformer outlet 44*b* is formed as a plurality of openings in a wall of the reformer that abuts the anode current collector 22*a* and the inlet port 54 is formed as a plurality of openings corresponding to the reformer outlet 44*b* openings in a wall of the anode current collector 22*a* that abuts the reformer 30.

The ratio of the fuel flow amounts between the first and second portions of fuel is based on thermal management requirements of the stack 12 and also on the pressure drop across the associated anode current collector 22*a*. In particular, for improved thermal management and gas mixing, it is desirable that all or substantially all of the fuel flow is directed from the reformer 30 directly to the associated anode current collector 22*a* as the first portion of the fuel. However, pressure drop in the associated anode current collector 22 should be minimized in order to keep the differential pressure between the anode and the cathode sides in the reformer-associated cell assembly 16A within 7". As a result, if the pressure drop in the associated anode current collector 22 is too high, the amount of fuel flow as the second portion of the fuel to the fuel turn manifold 48 is increased so as to reduce the pressure drop in the associated anode current collector 22.

As discussed in more detail herein below, reformed or partially reformed first portion of the fuel flows unobstructed through the associated anode current collector 22*a* which is free of reforming catalyst or stores only a small amount of reforming catalyst therein. In addition, the associated anode current collector 22*a* does not include any baffles or has only a few baffles so as to allow the fuel to flow through the current collector unobstructed. The first portion of the fuel undergoes an electrochemical reaction in the reformer-associated cell assembly 16A and exits the associated anode current collector 22*a* through an outlet port 38 into the fuel turn manifold 48. In the fuel turn manifold 48, the first portion of the fuel output from the outlet port 38 is mixed with the second portion of the reformed or partially reformed fuel from the reformer 30, and is then directed by the fuel turn manifold 48 to the other cell assemblies 16B.

The absence of reforming catalyst in the associated anode current collector 22*a* or the reduced catalyst loading in the associated current collector 22*a* enables endothermic cooling from the reforming reaction in the reformer 30 to be transferred to the cell assemblies 16B not associated with the reformer, and, in particular, to the cell assemblies 16B which are located further away from the reformer 30 and which need additional cooling. The reduced or no catalyst loading in the associated anode current collector 22*a* also allows the reformer 30 to achieve a high reforming rate, without reducing direct internal reforming within the assemblies 16B not associated with the reformer, and thus without reducing the cooling resulting from the direct internal reforming in those assemblies 16B. Further, the absence of catalyst or reduced catalyst loading in the associated anode current collector lowers the pressure drop across the reformer-associated cell assembly 16A and results in a decreased pressure differential between the anode and cathode sides of the assembly.

As shown in FIG. 1, reformed or partially reformed fuel received in the fuel-turn manifold 48, comprising a mixture of the second portion of the fuel from the reformer 30 and the first portion of the fuel partially spent in and output from the reformer-associated cell assembly 16A, is directed to the cell assemblies 16B not associated with the reformer. In particular, fuel from the fuel-turn manifold 48 enters the fuel inlet ports 38*a* of the cell assemblies 16B and flows through the fuel gas channels 32 of the respective cell assemblies 16B where the fuel undergoes an electrochemical reaction in the anode electrode to produce electricity. The fuel flows through the gas channels 32 in a general direction of fuel gas exhaust ports 40, in a cross-flow configuration with respect to the flow of oxidant flow. In particular, the flow of fuel through the anode side of each assembly 16B is perpendicular to the flow of oxidant gas through the cathode side of the assembly 16B. Such cross-flow configuration accomplishes uniform flow of fuel to each fuel cell and results in a low cost and simple design of the cell assembly 16B. The cross-flow configuration of the anode side of the assembly 16B is described in more detail below with reference to FIG. 4. In certain embodiments, the flow of fuel through each assembly 16B has a Z-pattern flow configuration, which is described in more detail below with reference to FIG. 5.

As mentioned herein above, the fuel flowing through the gas channels 32 of the cell assemblies 16B is also directly internally reformed by the reforming catalyst stored in the channels 32. The direct internal reforming of fuel within each assembly 16B produces cooling within the assembly 16B. As described in more detail below, the reforming catalyst may be loaded within the channels 32 at varying loading densities so as to achieve greater or smaller amounts of cooling in predetermined areas of the respective assembly 16B and to accomplish a desired thermal profile of the stack.

As shown in FIG. 1, spent fuel, after undergoing the electrochemical reaction in the anode of the cell assembly 16B, is output from the fuel gas exhaust ports 40 of the anode current collector 22 into the anode exhaust stack manifold 52. Spent fuel received in the stack manifold 52 may then be exhausted out of the fuel cell assembly 10. In certain embodiments, all or a portion of the spent fuel may be recycled for further use in the fuel cell assembly 10. Also, in some embodiments, spent fuel may be further processed so as to extract water therefrom for humidifying fuel input into the assembly, before recycling the remaining spent fuel to the assembly 10 or exhausting it from the assembly 10.

Figure 2:
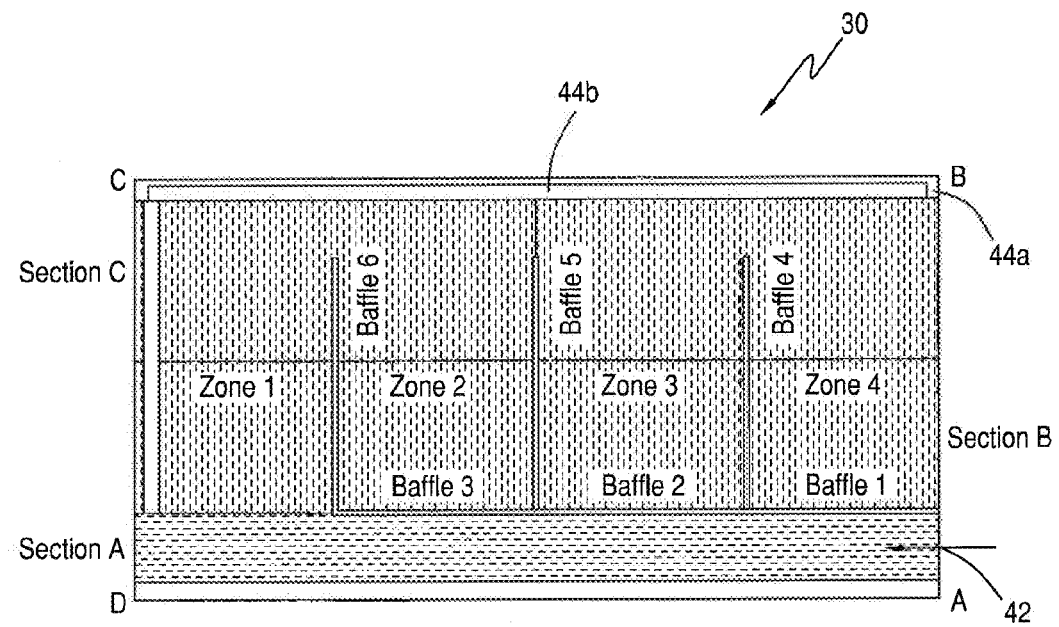
FIG. 2 shows a schematic plan view of the layout of the reforming unit used in the fuel cell stack of FIG. 1.

An illustrative configuration of a reformer 30 that can be used in the fuel cell assembly 10 of FIG. 1 is shown in more detail in FIG. 2. The reformer 30 shown is rectangular in shape and has dimensions corresponding to the dimensions of the fuel cell stack's 12 cross-section. The corners of the reformer are labeled A through D and correspond to the respective corners of the fuel cell stack 12. Corner A of the reformer is adjacent the fuel inlet of the reformer and corresponds to the corner of the fuel cell stack that is adjacent the fuel inlet and oxidant outlet faces. Corner B of the reformer is adjacent the fuel gas outlet of the reformer and corresponds to the corner of the fuel cell stack 12 which is adjacent the fuel inlet and oxidant inlet faces of the stack 12. Corner C of the reformer is also adjacent the fuel gas outlet of the reformer and corresponds to the stack corner which is adjacent the fuel outlet and oxidant inlet faces of the stack 12, while corner D of the reformer corresponds to the fuel cell stack corner adjacent the oxidant outlet face and fuel outlet faces of the stack. The reformer sidewall extending between corners A and B of the reformer faces the third face 1C of the stack 12 and is enclosed by the fuel-turn manifold 48. Reformer sidewall extending between corners B and C faces the first stack face 1A corresponding to the oxidant inlet side of the stack, while reformer sidewall extending between corners C and D faces the fourth stack face 1D and is enclosed by the manifold 52. Finally, reformer sidewall that extends between corners D and A of the reformer faces the second stack face 1B, corresponding to the oxidant outlet face of the stack, and is enclosed by the manifold 50.

Referring to FIG. 2, the reformer 30 comprises a plurality of sections, including a fuel inlet section, labeled as Section A, and reforming sections, labeled as Section B and Section C. As discussed in more detail below, a plurality of baffles, labeled as Baffle 1-6, are provided in the reformer to define the Sections A-C and to guide the fuel through these sections to achieve a desired fuel flow and distribution through the reformer.

As shown in FIG. 2, fuel gas enters the reformer 30 through the fuel gas inlet 42 and flows along the inlet Section A so as to be laterally distributed along Section A. From Section A, the fuel flows into and through Section B, which includes a plurality of zones 1-4. The first zone of Section B, labeled as "Zone 1," is located furthest away from the reformer inlet 42, while the fourth zone of Section B, labeled as "Zone 4," is located adjacent to the reformer inlet 42. The second and third zones of Section B, labeled as "Zone 2" and "Zone 3," are located in the central portion of Section B, between the first and fourth zones.

As shown in FIG. 2, a plurality of baffles 1-3 are provided to separate the inlet Section A from the reforming Section B of the reformer and to guide the flow of fuel from the inlet Section A to the four zones of Section B. In particular, Baffle 1 is provided at the inlet of the fourth zone, Zone 4, to achieve a desired flow restriction of the fuel from the inlet Section A to the fourth Zone 4. Similarly, Baffle 2 is provided at the inlet of the third zone, Zone 3, and Baffle 3 is provided at the inlet of the second zone, Zone 2, to restrict the flow of fuel from the inlet Section A to the third and second zones, respectively. Baffles 1-3 also ensure that the fuel flowing through the inlet Section A is distributed throughout the inlet section and into each of the zones of the reforming Section B. In particular, Baffles 1-3 are calibrated to have flow resistances from Section A to each zone in Section B so as to achieve a desired flow distribution of fuel through each zone of Section B. In addition, as shown in FIG. 2, zone 1 is free of baffling to ensure that the flow of fuel through the reformer 30 is constant, particularly if Baffles 1-3 are non-optimized.

As also shown in FIG. 2, Baffles 4-6 are provided in the reformer 30 to separate the respective zones of Section B and to straighten and guide the flow of fuel through each zone of Section B. In particular, Baffle 4 is provided between Zone 4 and Zone 3, Baffle 5 is provided between Zone 3 and Zone 2, and Baffle 6 is provided between Zone 2 and Zone 1. In certain embodiments, Baffles 4-6 may extend into Section C of the reformer so as to further guide the flow of fuel to achieve a desired fuel flow through the reformer.

The Baffles 1-6 used in the reformer may have various constructions. In certain embodiments some or all of the baffles are formed from one or more of: rods inserted into the corrugations of the reformer 30, porous structured materials inserted into or between the corrugations of the reformer 30 or sheet metal folded at the edge to form mechanical baffles. The materials from which the baffles 1-6 are formed have be able to withstand the high temperatures in the fuel cell stack. For example, ceramic rope is a suitable porous structured material for forming one or more of Baffles 1-6.

In addition, the configuration and arrangement of the baffles in the reformer is not limited to the one shown in FIG. 2. In particular, since the optimum thermal management in the fuel cell stack 12 is best achieved by routing substantially all of fuel gas flow from the reformer 30 to the reformer-associated cell assembly 16A, the configuration of the baffles may be varied to achieve such routing.

As shown in FIG. 2 and as mentioned herein above, the reformer includes an outlet 44b through which fuel gas flows to the associated or adjacent anode 20 and current collector 22 of a reformer-associated cell assembly 16B. The outlet 44b is formed in the top portion of the enclosure of the reformer that abuts the associated current collector 22. In the embodiment shown in FIG. 2, the outlet 44b is L-shaped and extends along, or adjacent to, the wall of the reformer between corners B and C and partially along, or adjacent to, the wall between corners C and D of the reformer. In particular, the reformer outlet 44b extends from corner C in the direction of corner D over end portions of Sections C and B of the reformer, without reaching the inlet Section A of the reformer. In other embodiments, the reformer outlet 44b extends only between corners B and C of the reformer or only between corners C and D of the reformer.

In the illustrative embodiment shown in FIG. 2, the reformer also includes a second outlet 44a, which outputs the second portion of the fuel into the fuel-turn manifold 48. As discussed above with respect to FIG. 1, the second portion of the reformed or partially reformed fuel is output from the reformer's second outlet 44a into the fuel-turn manifold 48 and thereafter supplied to the cell assemblies 16B not associated with the reformer. The first portion of the reformed or partially reformed fuel is output from the reformer's outlet 44b to the anode current collector 22 of the reformer-associated cell assembly 16A. However, in other embodiments, all of the fuel flowing through the reformer 30 is outputted to the reformer-associated cell assembly 16A through the outlet 44b, and in such other embodiments, the reformer 30 does not include the second outlet 44a shown in FIG. 2.

Figure 2A:
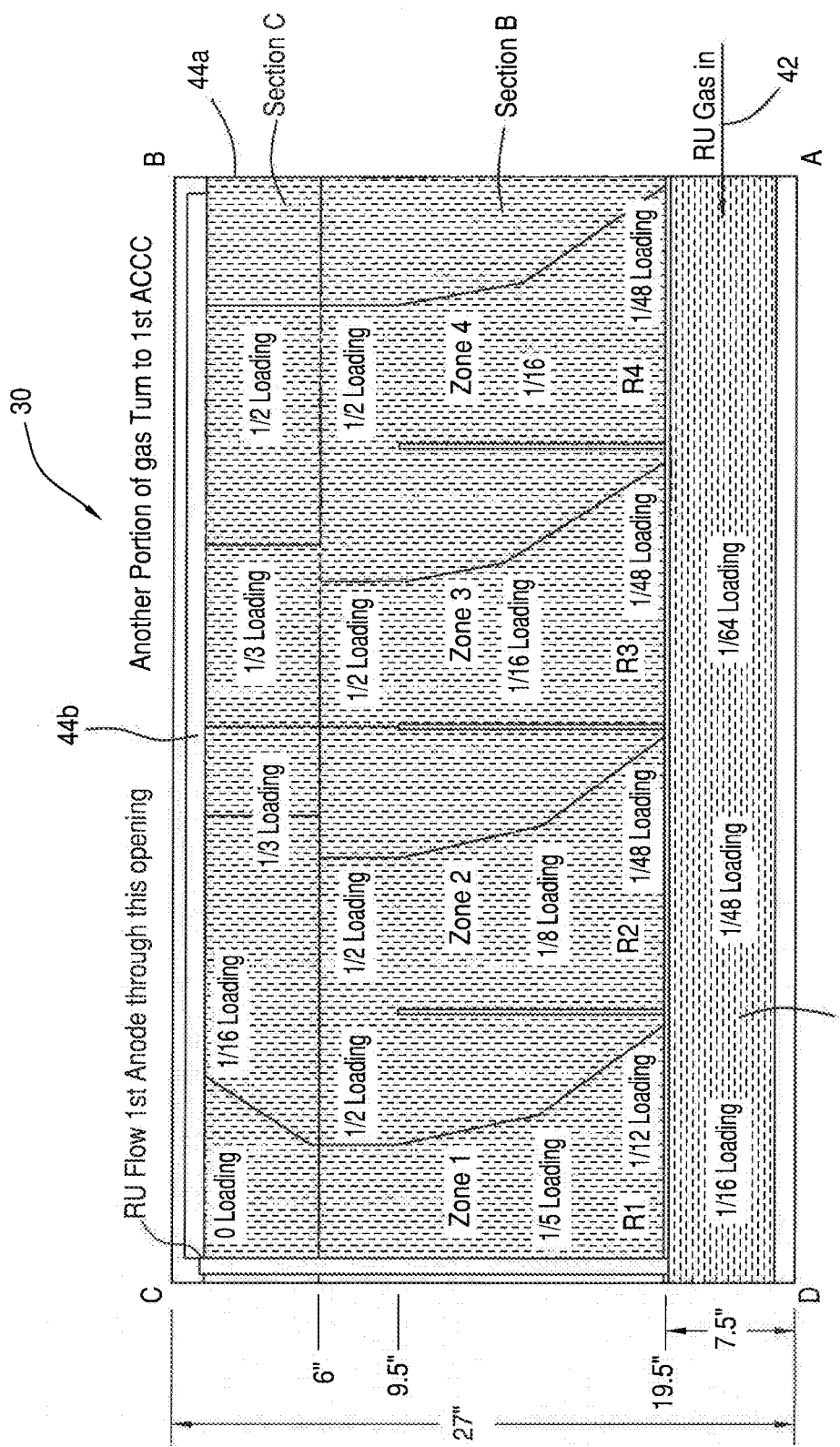
FIG. 2A shows a schematic plan view of reforming catalyst loading in the reforming unit of FIG. 2.

The reformer 30 shown in FIG. 2 includes reforming catalyst disposed in the corrugations of the reformer to promote the reforming of the fuel. The loading density of the reforming catalyst in the reformer, and in particular in the different Zones and Sections of the reformer, may be varied for improved thermal management in the stack and to achieve the desired temperature distributions in the reformer. In particular, greater loading density of the reforming catalyst can be provided in the areas of the reformer where additional cooling is required, and smaller loading density of the reforming catalyst is provided in areas of the reformer which do not require as much cooling. In addition, gradual loading density variations are preferred so as to obtain smooth thermal transitions in the reformer. FIG. 2A shows an illustrative catalyst loading configuration which can be used in the reformer 30 of FIG. 2.

As shown in FIG. 2A, the reforming catalyst loading densities are varied not only between the different sections of the reformer, but also within each section of the reformer. The loading density of the reforming catalyst disposed in the inlet section A of the reformer is lower than the loading density in the other sections. As shown, the initial catalyst loading density in the inlet section A of the reformer near the inlet 42 is 1/64, i.e. 1 catalyst unit or pellet for every 64 corrugations. The loading density in the inlet section then increases to 1/48 and thereafter to 1/16 as the fuel travels along the length of the inlet section A.

In the illustrative embodiment shown in FIG. 2A, the catalyst loading density in Section B of the reformer, and in particular, in each of the Zones 1-4 is greater than the catalyst loading density in the inlet section A. In addition, the catalyst loading density in Zone 1 is greater than the catalyst loading in Zones 1-4, the catalyst loading density in Zone 2 is smaller than in Zone 1 but greater than in Zones 3-4, and the catalyst loading density in Zones 3 and 4 is smaller than in Zones 1 and 2.

In particular, the catalyst loading density in Zone 1 is 1/12, i.e. 1 catalyst unit or pellet for every 12 corrugations, in an area adjacent to the inlet section A and to the outlet 56 of the reformer, and thereafter gradually increases to 1/5 loading density. A portion of Zone 1 that extends from the inlet section A to Section C of the reformer and which is adjacent to Zone 2 has increased catalyst loading at 1/2 loading density.

The catalyst loading density in Zone 2 is 1/48, i.e. 1 catalyst unit or pellet for every 48 corrugations, in an area adjacent to the inlet section A and to Zone 1 of the reformer, and thereafter gradually increases to 1/8 loading density and to 1/2 loading density in the direction from the inlet section A to Section C of the reformer. Additionally, a portion of Zone 2 which extends from the inlet section A to Section C of the reformer and which is adjacent to Zone 3 has an increased catalyst loading density of 1/2.

The catalyst loading density in Zone 3 is 1/48 in an area of Zone 3 adjacent to the inlet section A and to Zone 2 of the reformer, and thereafter gradually increases to 1/16 loading density and 1/2 loading density in the direction from the inlet section A to Section C of the reformer. In addition, a portion of Zone 3 which extends from the inlet section A to Section C of the reformer and which is adjacent to Zone 4 has an increased catalyst loading density of 1/2. Similarly, the catalyst loading density in the area of Zone 4 that is adjacent to the inlet section A and to Zone 3 of the reformer is 1/48, and thereafter increases to 1/16 and to 1/2 loading density in the direction from Section A to Section C of the reformer.

In the outlet Section C of the reformer, the catalyst loading density is 1/2 in the area adjacent to Zone 4 and a portion of Zone 3 of the reformer, thereafter gradually decreasing to a loading density of 1/3 in the area adjacent to a portion of Zone 3 and a portion of Zone 2, and to a loading density of 1/16 in the area adjacent to a portion of Zone 2 and a portion of Zone 1. The catalyst loading density is gradually reduced to 0 in the outlet area near corner C of the stack.

The catalyst loading configuration shown in FIG. 2A achieves a temperature distribution which provides more cooling in the central area of the reformer as well as in the area of the reformer near the fuel outlet side of the stack. The configuration of FIG. 2A also reduces temperature gradients in the reformer-associated cell assembly 16A. It is understood, however, that the catalyst loading configuration shown in FIG. 2A is illustrative and can be modified depending on the configuration of the fuel cell stack and so as to achieve other temperature distributions to provide more cooling to other areas of the stack.

Referring now back to FIG. 1, fuel gas leaving the reformer 30 through the outlet 44b enters the inlet 54 of the associated current collector 22 of the reformer-associated cell assembly 16A. In the associated current collector, fuel flow has a co-flow configuration relative to the oxidant gas flow, i.e. parallel to the oxidant gas flow, in certain areas of the associated anode current collector, and a cross-flow configuration relative to the oxidant gas flow, i.e. perpendicular to the oxidant gas flow, in other areas of the associated anode current collector. The co-flow configuration of the fuel flow in the anode current collector is shown by arrows "D" in FIG. 1, while the cross-flow configuration of the fuel flow in the anode current collector is shown by arrows "E" in FIG. 1.

Figure 3:
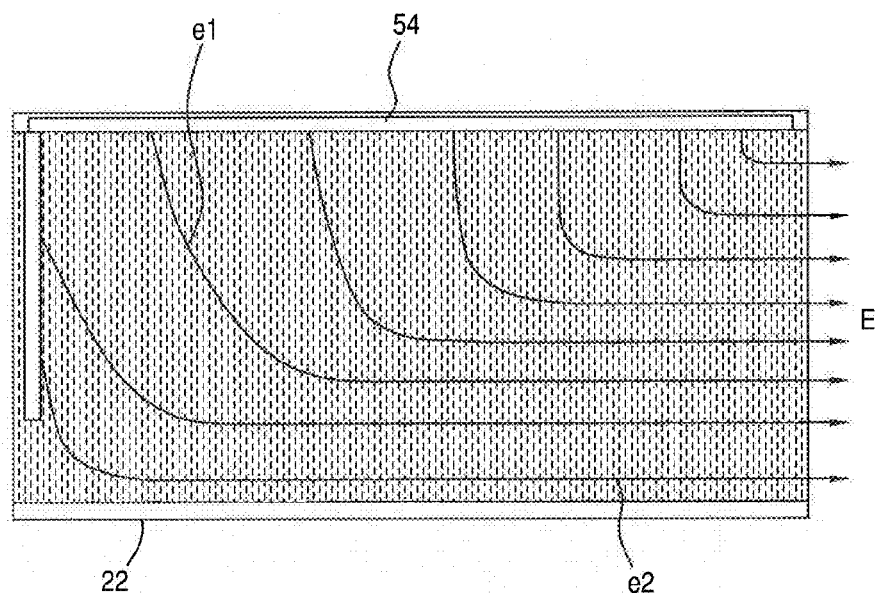
FIG. 3 shows the fuel flow path in the anode adjacent the reforming unit of FIG. 2.

FIG. 3 shows in more detail the anode current collector 22 of the reformer-associated cell assembly 16A of FIG. 1 and the flow path of fuel gas through the current collector 22. As shown, the anode current collector 22 includes an inlet 54, the relative location and shape of which corresponds to the location and shape of the outlet 44b of the reformer. The fuel flows through the channels 32 in the anode current collector 22 and the direction of the fuel flow through the current collector 22 is illustrated by arrows "E", which include portions "e1" and "e2". Portions "e1" of the arrows "E" represent the flow of fuel which is substantially parallel to the flow of oxidant gas through the fuel cell stack, i.e. having a co-flow configuration. Portions "e2" of the arrows "E" represent the direction of the flow of fuel which is perpendicular to the flow of oxidant gas through the fuel cell stack, i.e. having a cross-flow configuration.

As shown, the flow of fuel through the anode current collector of the reformer-associated assembly 16A starts in the same direction as the flow of oxidant gas through the stack, and then changes direction so that the fuel flows in a direction that is perpendicular to the flow of oxidant gas toward the outlet of the anode current collector 38. Fuel gas exits the channels 32 of the anode current collector substantially uninhibited through the outlet 38, shown by the arrows "E" and is outputted into the fuel-turn manifold 48.

Fuel gas is not completely reacted during the electrochemical reaction in the associated or adjacent anode 20 of the reformer-associated assembly. Fuel gas exhaust leaving the anode current collector 22 of the reformer-associated assembly 16A and collected in the fuel-turn manifold 48 is then distributed to the other cell assemblies 16B not associated with the reformer. In this way, unreacted fuel in the fuel gas exhaust of the reformer-associated assembly 16A is electrochemically reacted in the other cell assemblies 16B to produce electricity.

Figure 4:
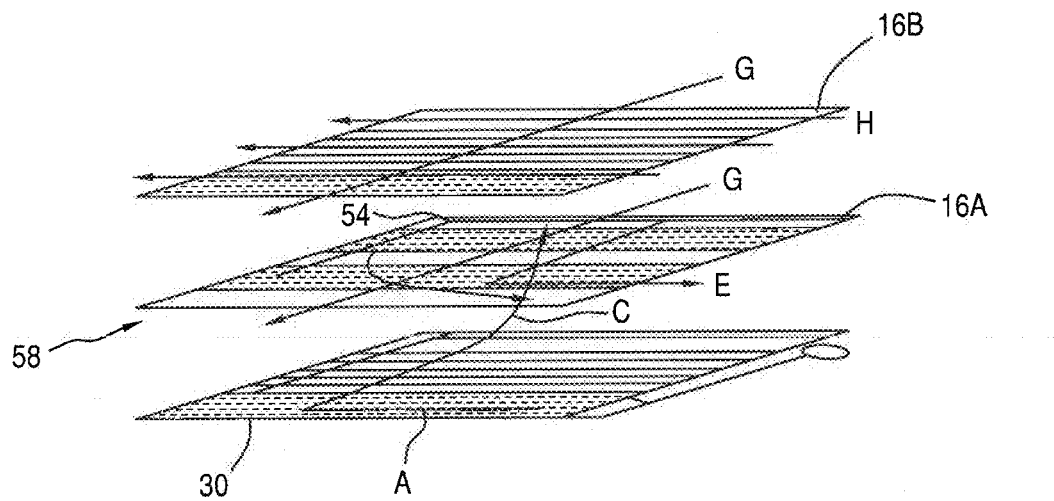
FIG. 4 shows the fuel gas flow path from the reforming unit to the anode adjacent thereto, and the cross-flow of fuel gas exhaust and oxidant gas with respect to successive anodes within the stack.

As discussed herein above with respect to FIG. 1, in certain embodiments, the flow of fuel through the anode side of the cell assemblies 16B not associated with the reformer 30 has a cross-flow configuration relative to the flow of oxidant fuel through these assemblies. FIG. 4 shows the flow of fuel in such embodiments, including the flow of fuel through the reformer 30, through the fuel cell 58 of the reformer-associated assembly 16A and through the next cell assembly 16B not associated with the reformer. The flow of fuel through the next cell assembly 16B is exemplary of the flow of fuel through the other cell assemblies in series with cell 58.

As shown in FIGS. 1 and 4, the flow of fuel gas through the reformer 30 is labeled by the arrow "A" and the continued flow of fuel from the reformer 30 to the fuel gas inlet 54 of the reformer-associated cell assembly 16A is labeled by the arrow "C." As also shown, the flow of fuel passing through the anode 20 and anode current collector 22 of the reformer-associated cell assembly 16A is indicated by arrows "E", which show the fuel flowing first in a co-flow configuration with respect to the oxidant gas and thereafter changing to the cross-flow configuration relative to the flow of oxidant gas. The co-flow and cross-flow configuration of the fuel flow through the reformer-associated assembly 16A is shown by the relationship between arrows "E" and "G", wherein the arrow "G" represents the direction of the oxidant flow. As discussed above, fuel leaving the reformer-associated assembly 16A is outputted to the fuel-turn manifold 48, which directs the fuel to the fuel inlets of the other assemblies 16B not associated with the reformer 30.

The direction of the flow of fuel from the fuel-turn manifold 48 through the anode side of the successive assemblies 16B not associated with the reformer is shown by arrows "H" in FIG. 4. As can be seen in FIG. 4, the fuel gas flows through the anodes and anode current collectors of the successive assemblies 16B in a cross-flow configuration relative to the direction of the flow of oxidant gas. This cross-flow configuration is demonstrated by the arrows "H" and "G" which show the flow of fuel and oxidant, respectively, through the assembly. The cross-flow arrangement of the flow fields through the assemblies 16 of the stack as shown in FIG. 4 ensures uniform distribution of the fuel to the successive cell assemblies 16B in the stack 12, while maintaining low cost and simple design of the stack.

Figure 5:
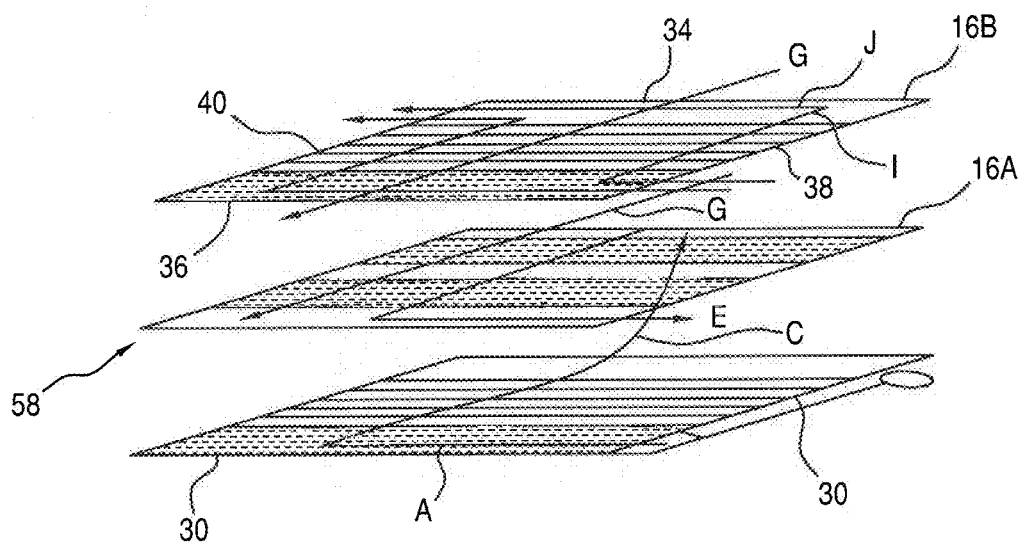
FIG. 5 shows an alternative flow field in which fuel gas exhaust is distributed among successive anodes in a Z-pattern in which fuel flow is initially in co-flow with the oxidant gas and thereafter in counter-flow with the oxidant gas across such anode or anodes.

As discussed above, in certain embodiments, the cell assemblies 16B not associated with the reformer have a Z-pattern flow configuration for the flow of fuel through the anode side is the assemblies 16B. FIG. 5 shows the flow of fuel in such embodiments, including the flow of fuel through the reformer 30, through the fuel cell 58 of the reformer-associated assembly 16A and through the next cell assembly 16B not associated with the reformer. The flow of fuel through the next cell assembly 16B is exemplary of the flow of fuel through the other cell assemblies in series with cell 58.

As shown in FIG. 5, the flow of fuel through the reformer 30 and through the fuel cell 58 of the reformer-associated cell assembly 16A is the same, or substantially the same, as the flow of fuel through the reformer and the reformer-associated cell assembly of FIG. 4. As in FIG. 4, the fuel leaving the reformer-associated cell assembly 16A is outputted to the fuel-turn manifold 48 which directs the fuel to the next or successive cell assemblies 16B not associated with the reformer.

In FIG. 5, the Z-pattern flow path of fuel through the anode 20 and anode current collector 22 of the successive cell assemblies 16B is shown by arrows "I" and "J." As shown, the arrow "I" shows the direction of the fuel flow in a counter-flow configuration relative to the oxidant gas flow, labeled by arrow "G," while the arrow "J" shows the direction of fuel flow in a cross-flow configuration relative to the flow of oxidant gas. In the Z-pattern flow configuration shown in FIG. 5, the fuel flow path combines the counter-flow direction of the fuel flow and the cross-flow direction of the fuel flow relative to the direction of the oxidant gas flow, so that the fuel flowing through each of the successive assemblies 16B flows in a direction counter to the direction of oxidant flow over a portion of its path and in a direction substantially perpendicular to the direction of the oxidant flow over the other portion of its flow path. As shown in FIG. 5, some of the fuel flowing the assembly 16B first has a counter-flow configuration and thereafter has a cross-flow configuration relative to the oxidant gas flow, while another portion of the fuel flowing through the assembly has a cross-flow configuration followed by the counter-flow configuration.

The Z-pattern flow path configuration of the fuel is achieved by blocking a portion of the fuel gas inlet port 38 of the anode current collector 22 so as to impede the flow of fuel through the blocked portion of the fuel gas inlet port 38a and to direct the fuel to enter the anode current collector 22 only through the open or unblocked portion of the fuel gas inlet port 38a. As shown in FIG. 5, the blocked portion of the fuel gas inlet port 38a starts from a corner of the anode current collector 22 adjacent to the oxidant gas inlet ports 34 and the first stack face 1A and extends along the portion of the fuel gas inlet port 38a in a direction of the other corner of the anode current collector 22 adjacent to the oxidant gas outlet ports 36 and the second stack face 1B. In this way, an open fuel inlet portion is formed in the anode current collector 22 which is near the oxidant gas outlet ports 36 of the stack 12, so that fuel is directed to enter the anode current collector 22 adjacent to the oxidant outlet face 1B of the stack 12.

As shown, a portion of the fuel outlet port 40 of each assembly 16B can also be blocked off so as to direct the fuel leaving the anode current collector 22 through the open, or unblocked, portion of the outlet port 40. In particular, the blocked off portion of the fuel outlet port 40 extends from a corner of the anode current collector 22 adjacent to the oxidant gas outlet ports 36 and the second stack face 1B in a direction of the other corner of the anode current collector 22 adjacent to the oxidant gas inlet ports 34 and the first stack face 1A. The open or unblocked portion of the fuel outlet port 40 is located adjacent to the first face of the stack 1A and the oxidant inlet ports 34.

The blocked off portions of the fuel inlet port and the fuel outlet port are formed by using baffles, wall extensions or any other suitable means for impeding the flow of fuel through the inlet and outlet ports. The blocking of the portions of the fuel inlet and the fuel outlet ports as described above directs the fuel to enter the anode current collector 22 of each assembly 16B adjacent to, or near, the face of the stack 1B associated with the oxidant outlet ports 36, to flow through the anode side of the assembly 16B in a Z-shaped path and to exit the anode current collector 22 adjacent to, or near, the face of the stack 1A associated with the oxidant inlet ports 34. This configuration of the anode current collector 22 combines the cross-flow and counter-flow configurations of the fuel relative to the oxidant gas flow since the fuel is directed to flow in a direction perpendicular to the flow of oxidant gas and also in a direction opposite to that of the flow of oxidant gas in order to get from the open portion of the fuel inlet port 38 to the open portion of the fuel outlet port 40.

In addition, one or more baffles may be used in the anode current collector to direct the flow of fuel in the Z-pattern flow path, and/or the direction of the corrugations in the anode current collector 22 of each assembly 16B may be configured so as to direct the flow of fuel through the anode current collector in a Z-shaped path. One or more baffles may also be used to control the fuel flow distribution through the anode current collector so as to achieve fuel flow uniformity throughout the anode current collector. In certain embodiments, the baffles and/or the configured direction of the corrugations are used together with the blocked off fuel inlet and outlet port portions to promote the flow of fuel in a Z-shaped path. In other embodiments, the baffles and/or the configured direction of the corrugations may be used without blocking off portions of the fuel inlet and outlet portions to achieve the Z-pattern flow path.

As shown in FIGS. 1 and 5, the Z-pattern flow path configuration through the anode side of the cell assemblies 16B realizes the counter-flow configuration of the fuel relative to the oxidant fuel without requiring separate fuel and oxidant gas manifolds to be present on the same sides of the stack. The Z-pattern flow path configuration also results in a substantially lower differentials in pressure gradients along the anode flow channels, and in an improved uniformity of current density throughout the stack 12. As a result, greater efficiency in the production of electricity and extended service life of the stack 12 can be achieved.

Although the Z-pattern flow path configuration shown in FIG. 5 combines the combination of the cross-flow and counter-flow configurations of the fuel flow relative to the oxidant gas flow, it is understood that the Z-pattern flow configuration may be modified so as to combine the cross-flow and co-flow configurations of the fuel flow relative to the oxidant flow. Such modified Z-pattern flow configuration can be achieved by blocking off a portion of the anode current collector inlet from a corner of the anode current collector adjacent the oxidant gas outlet ports and the second face of the stack and by blocking off a portion of the anode current collector outlet from a corner of the anode current collector adjacent the oxidant gas inlet ports and the first face of the stack. In this way, fuel is allowed to enter the anode side of the cell assembly through the unblocked portion of the anode current collector inlet adjacent to the oxidant gas inlet ports and to flow through the anode side so as to exit through the unblocked portion of the anode current collector outlet adjacent to the oxidant gas outlet ports.

Figure 6:
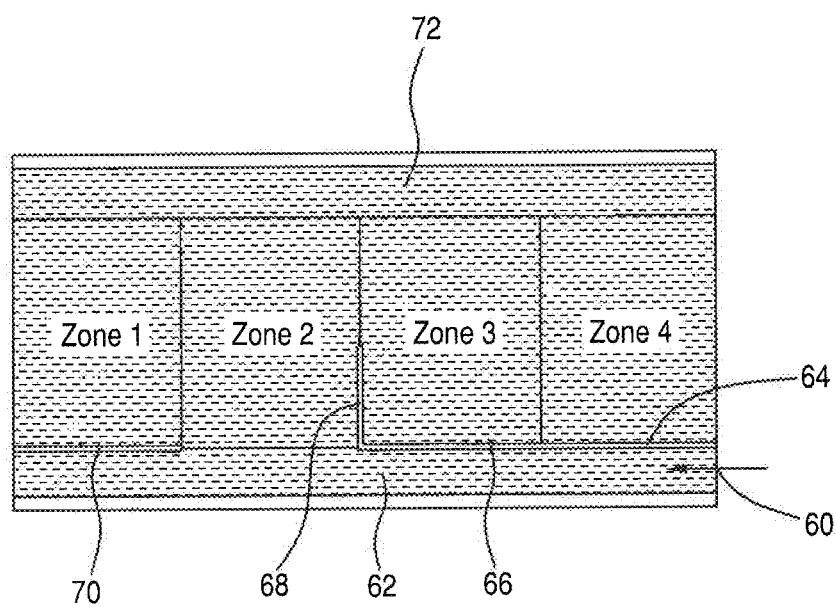
FIG. 6 shows a schematic plan view of the layout of the anode plate design enabling the flow field of FIG. 5.

FIG. 6 shows an illustrative construction of an anode current collector of one of the cell assemblies 16B not associated with a reformer, wherein the anode current collector enables the Z-pattern flow configuration discussed above. As shown, the anode current collector includes an inlet 60 through which fuel enters the anode current collector, an inlet section 62 of the current collector, an outlet section 72 of the current collector, a central area divided into a plurality of zones, i.e. zones 1-4, and a plurality of baffles for directing the flow of fuel through the anode current collector.

In particular, the inlet 60 of the anode is formed as an unblocked portion of the inlet side of the anode current collector and extends from the corner of the anode current collector adjacent to the oxidant gas outlet ports of the stack. Fuel enters the anode current collector through the inlet 60 in cross-flow configuration relative to the oxidant gas. In the anode current collector, the fuel is first distributed over the inlet section 62 of the anode current collector which extends from the inlet 60 along the length of the side of the current collector adjacent to, or aligned with, the oxidant outlet ports.

As shown in FIG. 6, the plurality of baffles 64, 66, 68 and 70 are disposed in the anode current collector for directing the fuel flow from the inlet section 62 to the respective zones of the central section of the anode current collector. In particular, baffles 64, 66 and 70 are disposed between the inlet section 62 and Zone 4, Zone 3 and Zone 1, respectively. These baffles 64, 66 and 70 provide flow resistance to limit the amount of fuel flowing into each of Zone 4, Zone 3 and Zone 1, respectively, so that the fuel is distributed between the Zones 1-4. The flow resistance of each baffle 64, 66 and 70 may be adjusted so as to allow greater or smaller amount of fuel flow from the inlet section to the Zone corresponding to the baffle. In the illustrative embodiment of FIG. 6, no baffle is provided between the inlet section 62 and Zone 2 so that the fuel flow from the inlet section 62 into Zone 2 is unobstructed. In addition, baffle 68 extends between Zone 2 and Zone 3 for directing the flow of fuel along Zone 2 and along Zone 3 and preventing the mixing of fuel between Zones 2 and 3.

The combination of baffles 64, 66, 68 and 70 as shown in FIG. 6 results in a Z-pattern flow configuration of the fuel flow through the anode side of the cell assembly 16B. In particular, the flow of fuel along the inlet section 62 and the outlet section 72 of the anode current collector has a cross-flow configuration relative to the oxidant gas flow, while the flow of fuel along Zones 1-4 of the central section of the anode current collector has a counter-flow configuration relative to the oxidant gas flow. It is understood that in other illustrative embodiments, the baffles 64, 66, 68 and 70 may be arranged so that the fuel flow along Zones 1-4 of the central section of the anode current collector has a co-flow configuration relative to the oxidant gas flow.

In the embodiment shown in FIG. 6, the loading of the reforming catalyst in the anode current collector is varied so as to provide a desired flow resistance and a desired amount of reforming in each section of the anode current collector. In particular, the inlet section 62 of the anode current collector has low or no reforming catalyst disposed therein so as to minimize fuel flow resistance. In each of Zones 1-4, catalyst loading density is increased relative to the catalyst loading density in the inlet section 62 so as to increase flow resistance in Zones 1-4 and to achieve flow uniformity through the Zones 1-4. The greater catalyst loading density in Zones 1-4 lowers the gas flow velocity due to the increased flow resistance, and optimizes the electrochemical reaction needed to produce electricity. As a result, most of the direct internal reforming occurs in Zones 1-4 of the central section. As discussed herein below, the reforming catalyst loading density in each of Zones 1-4 may be varied from one Zone to another and throughout each zone. For example, the overall catalyst loading density in one of the Zones may be greater than the catalyst loading density in another zone so as to provide more reforming, and thus more cooling, in the zone with greater catalyst loading density. In addition, the density of the reforming catalyst loading can be varied along each Zone 1-4 so that the catalyst loading density is greatest in the areas of the cell assembly where the most cooling is required.

The configuration of the anode current collector shown in FIG. 6 is compatible with the structure and design of conventional carbonate fuel cell stacks. In particular, in conventional carbonate fuel cell systems, boundary regions, also called wet-seal regions, of each cell assembly are inactive where no electrochemical reaction occurs. U.S. patent application Ser. No. 12/016,564, which is incorporated herein by reference, discloses an example of such fuel cell design, particularly a fuel cell employing a bipolar separator plate that forms the wet seal regions of the fuel cell. The inlet and outlet sections of the anode current collector shown in FIG. 6, which are used for distributing fuel throughout the central section of the current collector and for collecting spent fuel gas from the central section, are disposed within the anode side wet seal regions of the cell assembly. By using the inactive wet seal regions for distributing and collecting fuel, the amount of reforming and the location of the central region of the anode current collector where the reforming occurs can be optimized for improved operation of the fuel cell assembly. In addition, pressure drop in the inlet section of the anode current collector is decreased, thus improving the uniformity in the flow of fuel through the central region of the anode current collector.

As described herein above, the assembly includes a two-stage supply of fuel to the fuel cell stack 12, wherein the first stage comprises fuel supply from one or more reformers 30 to a respective reformer-associated cell assembly 58, and the second stage comprises distribution of partially-reformed fuel from the fuel-turn manifold 48 to each of the remaining fuel cells of the stack 12. When compared to prior stack designs, the stack shown in FIG. 1 requires lower fuel flow for powering the stack 12 because the fuel from the first stage is recycled during the second stage. In addition, since the second stage receives and uses partially spent fuel from the first stage, the total amount of fuel flow to the stack may be reduced as compared to the total amount of fuel flow received in conventional stacks. As a result, high fuel utilization, i.e., high efficiency in the production of electricity, by the stack 12 is achieved by the two-stage configuration of the invention.

In addition to the two-stage fuel supply described above, the stack 12 shown in FIG. 1 has improved thermal management, which increases the stack's service and operating life.

The flow path of the fuel through the reformer 30, as described above, contributes to such improved thermal management by optimizing the endothermic reaction occurring in the reformer 30.

Also, the absence of catalyst or the reduced catalyst loading in reformer-associated cell assemblies 16A contributes to more stable stack temperature gradients compared to conventional stacks since fuel gas supplied thereto is reformed to a larger extent in the reformer 30. In particular, since there is no, or a very small amount of, reforming catalyst in the reformer-associated cell assembly 16A, a larger fraction of the endothermic reforming reaction can be produced by the reformer. Thus, the efficiency of the reformer and of the reforming reaction rate in the reformer are improved. This is particularly important to the performance and service life of the stack because the reforming catalyst in the reformer is not exposed to carbonate electrolyte and is therefore more likely to have stable activity as the stack ages. The improved reforming efficiency in the reformer therefore improves the thermal stability of the stack.

Also, the two-stage fuel supply in the assembly minimizes the volatility in temperature gradients that result from catalyst deactivation in the cell assemblies 16B not associated with the reformer 30 and improves uniformity in the reforming reaction in the reformer. The cell assemblies 16B not associated with the reformer also benefit from the cooling that results from the cooled fuel gas exhaust supplied from the reformer-associated cell assembly 16A to the fuel-turn manifold 48 and from the endothermic direct internal reforming reaction within each of the cell assemblies 16B. In particular, the higher reforming and thus higher cooling rate in the cell assemblies 16B not associated with the reformer reduces the peak current density within the cell assemblies and makes the current density distribution in the stack more uniform. Uniform current density reduces local high temperatures and results in an enhanced control of temperature gradients from one cell assembly 16B to another. Greater thermal stability and reduced temperature gradients in the stack result in reduced thermal stresses on the components of the stack and in decreased contact losses between the components of the cell assemblies.

Further, the fuel flow field in the reformer-associated cell assembly 16A causes a shift in current density distribution in the stack which results in an increased temperatures at the oxidant inlet and fuel outlet regions of the stack. The increased temperatures at the oxidant inlet and fuel outlet regions, in turn, increase the reforming activity of the catalyst disposed in the other cell assemblies 16B not associated with the reformer so as to provide adequate methane conversion. In addition, the shift in the current density in the fuel cell stack of FIG. 1 and the two-stage fuel delivery described above counteract the tendency to concentrate current density near the anode inlet region of the stack, which is often experienced by conventional stacks with cross-flow configuration. This, in turn, minimizes temperature shifts in the stack, particularly if the fuel utilization rate is increased, thus leading to higher operating efficiency of the stack. Furthermore, since the reformer inlet section is located near the oxidant outlet side of the neighboring cell assemblies, cooling is provided to the oxidant outlet gas, thus reducing thermal management requirements of the stack. For these reasons, the efficiency in the production of electricity by the stack and the service life of the stack are increased.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the present invention. For example, it is within the contemplation of the present invention to further provide thermal management for the stack by providing additional external means to modulate the fuel temperature even prior to entering the stack.

INCORPORATION BY REFERENCE

The following patents and published patent applications, assigned to the same assignee herein, are incorporated herein by reference:
U.S. Pat. No. 6,200,696
U.S. Pat. No. 5,175,062
U.S. Application Publication No. 2006/0123705
U.S. Application Publication No. 2004/0071617

What is claimed is:

1. A reformer for use in a fuel cell stack comprising:
an enclosure including an inlet port and an outlet port, the enclosure comprising first and second opposing surfaces connected by a plurality of sidewalls and the first opposing surface being configured to face a fuel cell in the fuel cell stack so as to directly abut the fuel cell; and
a plate assembly supporting reforming catalyst disposed within said enclosure,
wherein the reformer is an indirect internal reformer, and
wherein the outlet port of the reformer is disposed in the first opposing surface of the enclosure facing the fuel cell and positioned to align with a fuel inlet port of the fuel cell so that at least a first portion of fuel reformed by said reformer is supplied directly from said outlet port of said reformer to said fuel inlet port of said fuel cell without being conveyed through a manifold prior to being supplied to the inlet port of said fuel cell.

2. The reformer for use in the fuel cell stack in accordance with claim 1, wherein said reformer is configured to supply all of the fuel reformed by said reformer to said fuel inlet of said fuel cell adjacent said reformer, when said reformer is assembled into said fuel cell stack.

3. A reformer for use in a fuel cell stack comprising:
an enclosure including an inlet port, a first outlet port and a second outlet port, the enclosure comprising first and second opposing surfaces connected by a plurality of sidewalls and the first opposing sidewall being configured to face a fuel cell in the fuel cell stack so as to directly abut the fuel cell; and
a plate assembly supporting reforming catalyst disposed within said enclosure,
wherein the reformer is an indirect internal reformer,
wherein the first outlet port of the reformer is disposed in the first opposing surface of the enclosure facing the fuel cell and positioned to align with a fuel inlet port of the fuel cell so that at least a first portion of fuel reformed by the reformer is supplied directly from the first outlet port of the reformer to the fuel inlet port of the fuel cell, and
wherein the second outlet port of the reformer is disposed in one of the plurality of sidewalls and is configured to convey a second portion of said fuel reformed by said reformer to a manifold for distributing at least the second portion of the fuel to one or more further fuel cells when said reformer is assembled into said fuel cell stack.

4. The reformer for use in the fuel cell stack in accordance with claim 1, wherein said plate assembly comprises a plurality of sections including an inlet section communicating with said inlet port, an outlet section communicating with said outlet port and a central section disposed between said inlet section and said outlet section, and wherein said plate assembly comprises a plurality of baffles for directing fuel flow through said plate assembly, said plurality of baffles including at least one baffle disposed between said inlet section and said central section of said plate assembly.

5. The reformer for use in the fuel cell stack in accordance with claim 4, wherein:
said central section includes a plurality of zones, each of said zones communicating with said inlet section and with said outlet section, and each of said zones being disposed perpendicular to said inlet section; and
said plurality of baffles including at least one baffle disposed in said central section for directing fuel flow into each of said zones.

6. The reformer for use in the fuel cell stack in accordance with claim 5, wherein said inlet section of said plate assembly has a first loading density of said reforming catalyst supported by said inlet section, said central section of said plate assembly has a second loading density of said reforming catalyst, said second loading density being greater than said first loading density, and said outlet section of said plate assembly has a third loading density of said reforming catalyst, said third loading density being smaller than or equal to said second loading density.

7. The reformer for use in the fuel cell stack in accordance with claim 6, wherein said plate assembly has a varying loading density of said reforming catalyst, with said inlet section of said plate assembly having a varying loading density between 1/64 and 1/16, said central section of said plate assembly having a varying loading density between 1/48 and 1/2, and said outlet section of said plate assembly having a varying loading density between 0 and 1/2.

8. The reformer for use in the fuel cell stack in accordance with claim 1, wherein said outlet port comprises a plurality of apertures in a portion of said first opposing surface of said enclosure.

9. The reformer for use in the fuel cell stack in accordance with claim 1, wherein said enclosure comprises first, second, third and fourth sidewalls connecting said first opposing surface with said second opposing surface, wherein:
said first sidewall opposes said second sidewall, and said third sidewall opposes said fourth sidewall,
said inlet port is formed in said first sidewall adjacent said third sidewall, and
said outlet port is formed in said first opposing surface of the enclosure adjacent said fourth sidewall.

10. The reformer for use in the fuel cell stack in accordance with claim 9, wherein said reformer further comprises a further outlet port configured to output a second portion of said fuel reformed by said reformer to a fuel cell manifold when said reformer is assembled into said fuel cell stack, said further outlet port being formed in said second sidewall.

11. A fuel cell system comprising:
a plurality of fuel cell assemblies and at least one reformer, forming a fuel cell stack,
said plurality of fuel cell assemblies including at least one reformer-associated assembly and one or more non-reformer-associated assemblies, each said reformer-associated assembly being adjacent to and associated with a reformer,
wherein each said reformer includes an inlet port for receiving fuel and an outlet for outputting at least a first portion of fuel reformed in said reformer, the outlet of the reformer being coupled directly to a fuel inlet of a reformer-associated assembly associated with said reformer,
wherein each said reformer-associated assembly includes a fuel outlet for outputting partially spent fuel to one or more non-reformer-associated assemblies, and
wherein said reformer includes a further outlet coupled to said one or more non-reformer-associated assemblies without being coupled to the reformer-associated assembly, the further outlet being configured to output a second portion of said fuel reformed in said reformer for use in said one or more non-reformer-associated assemblies without conveying said second portion of said fuel to said reformer-associated assembly.

12. The fuel cell system in accordance with claim 11, wherein each said reformer comprises an enclosure including said inlet port, said outlet and said further outlet, and a plate assembly supporting reforming catalyst disposed within said enclosure, and wherein said outlet of said reformer abuts a fuel inlet port of said reformer-associated assembly associated with said reformer.

13. The fuel cell system in accordance with claim 12, wherein said enclosure of said reformer comprises first and second opposing surfaces, said first opposing surface abutting said reformer-associated assembly associated with said reformer, and wherein said outlet of said reformer is formed in said first opposing surface of said enclosure.

14. The fuel cell system in accordance with claim 13, wherein said outlet of said reformer comprises a plurality of apertures in a portion of said first opposing surface of said enclosure and said inlet port of said reformer-associated assembly associated with said reformer comprises a plurality of apertures in a surface of said reformer-associated assembly abutting said first opposing surface of said reformer.

15. The fuel cell system in accordance with claim 12, wherein each said reformer supplies all of the fuel reformed by said reformer to said inlet of said reformer-associated assembly associated with said reformer.

16. The fuel cell system in accordance with claim 12, wherein the plate assembly of each said reformer includes a plurality of sections, including an inlet section communicating with said inlet port, an outlet section communicating with said outlet and a central section disposed between said inlet section and said outlet section and wherein said plate assembly is configured so that fuel flows in a first direction through said inlet section and thereafter in a second direction through said central section and said outlet section, said second direction being perpendicular to said first direction.

17. The fuel cell system in accordance with claim 16, wherein each said reformer associated assembly includes a fuel outlet port for outputting said partially spent fuel for use in said one or more non-reformer associated assemblies and wherein each said reformer-associated assembly is configured so that fuel flows from said inlet port of said reformer-associated assembly in a third direction opposite to said second direction and thereafter flows in a fourth direction to said fuel outlet port, said fourth direction being perpendicular to said third direction and opposite to said first direction.

18. The fuel cell system in accordance with claim 17, wherein each said non-reformer associated assembly includes an anode side adapted to receive a portion of partially spent fuel from said at least one reformer-associated assembly, a cathode side adapted to receive oxidant gas and an electrolyte matrix disposed between said anode side and said cathode side, and wherein each said non-reformer-associated assembly is configured so that said oxidant gas flows through said cathode side in said third direction and said partially spent fuel flows through said anode side in at least said first direction, wherein said anode side includes reforming catalyst placed in flow channels formed in said anode side.

19. The fuel cell system in accordance with claim 18, wherein each said non-reformer associated assembly is configured so that said portion of said partially spent fuel flows through said anode side in at least said first direction and said second direction.

20. The fuel cell system in accordance with claim 19, wherein each said non-reformer associated assembly includes a fuel inlet side, a fuel outlet side opposing said fuel inlet side, an oxidant inlet side and an oxidant outlet side opposing said oxidant inlet side, wherein said oxidant inlet and oxidant outlet sides join said fuel inlet side and said fuel outlet side, and wherein said fuel inlet port is formed in a portion of said fuel inlet side adjacent one of said oxidant inlet side and oxidant outlet side and said fuel outlet port is formed in a portion of said fuel outlet side adjacent the other of said oxidant inlet side and oxidant outlet side.

21. The fuel cell system in accordance with claim 20, wherein said anode side of each said non-reformer-associated assembly includes a plurality of baffles for directing the flow of said partially spent fuel through said anode side of said non-reformer-associated assembly in said first direction and in said second direction, and wherein at least one of said baffles forms said fuel inlet port in said fuel inlet side of said non-reformer-associated assembly and at least another of said baffles forms said fuel outlet port in said fuel outlet side of said non-reformer-associated assembly.

22. The fuel cell system in accordance with claim 11, wherein said fuel cell stack includes a plurality of faces including a fuel inlet face, a fuel outlet face, an oxidant inlet face and an oxidant outlet face, said fuel cell system further comprising a plurality of manifolds including at least a fuel inlet manifold sealingly enclosing said fuel inlet face of said stack, and wherein each said reformer-associated assembly outputs partially spent fuel into said fuel inlet manifold and said fuel inlet manifold is configured to direct said partially spent fuel to said one or more non-reformer-associated assemblies.

23. The fuel cell system in accordance with claim 12, wherein:
said at least one reformer-associated assembly includes an anode side adapted to receive at least a first portion of said fuel from said reformer with which said reformer-associated assembly is associated, said anode side of said reformer-associated assembly including no reforming catalyst; and
each said non-reformer associated assembly includes an anode side adapted to receive a portion of partially spent fuel from said at least one reformer-associated assembly, said anode side of each said non-reformer associated assembly supporting reforming catalyst for directly reforming said partially spent fuel.

24. A fuel cell system comprising:
a plurality of fuel cell assemblies and at least one reformer in accordance with claim 1, forming a fuel cell stack,
said plurality of fuel cell assemblies including at least one reformer-associated assembly and one or more non-reformer-associated assemblies, each said reformer-associated assembly being adjacent to and associated with a reformer,
wherein each said reformer is configured to receive fuel through an inlet port and to output at least a first portion of fuel reformed in said reformer through an outlet port directly to a reformer-associated assembly associated with said reformer, and
wherein each said reformer-associated assembly is configured to output partially spent fuel for use in one or more non-reformer-associated assemblies.

25. A method of operating a fuel cell system comprising at least one reformer in accordance with claim 1 and a plurality of fuel cell assemblies including at least one reformer-associated assembly and one or more non-reformer-associated assemblies, said method comprising the steps of:
providing fuel to said at least one reformer;
reforming said fuel using said at least one reformer;
outputting at least a first portion of said fuel reformed by each said reformer directly to said reformer-associated assembly associated with said reformer; and
outputting partially spent fuel from each said reformer-associated assembly for use in one or more non-reformer-associated assemblies.

* * * * *